April 15, 1952     R. E. SHANNON     2,593,062
LIQUID LEVEL TANK GAUGE
Filed May 4, 1948     3 Sheets-Sheet 1
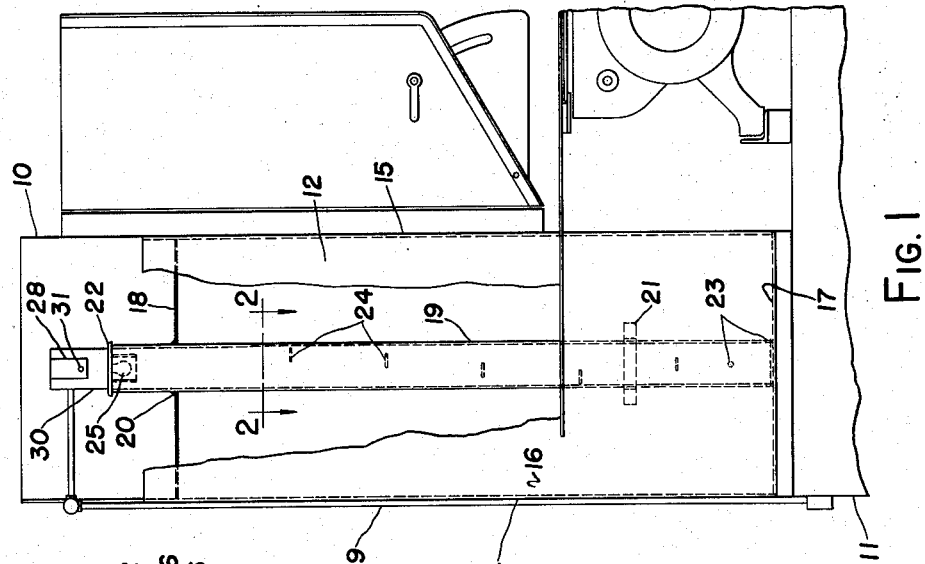
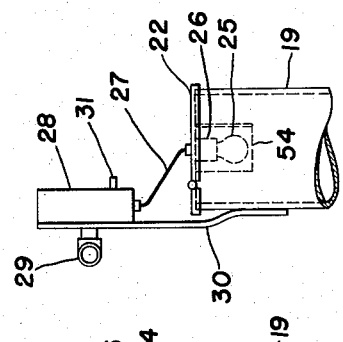
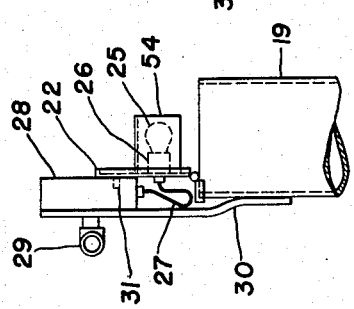
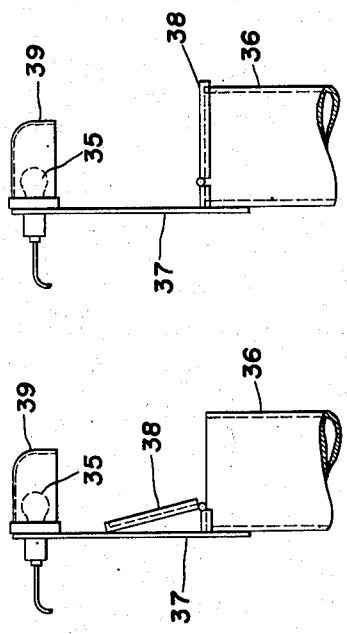
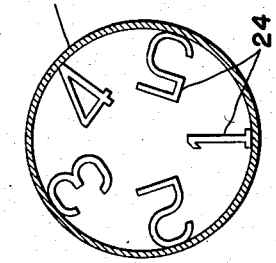
INVENTOR.
RAYMOND E. SHANNON
BY
*Otto Moeller*
Attorney April 15, 1952 R. E. SHANNON 2,593,062
LIQUID LEVEL TANK GAUGE
Filed May 4, 1948 3 Sheets-Sheet 2

INVENTOR.
RAYMOND E. SHANNON
BY
Otto Moeller
Attorney

April 15, 1952 R. E. SHANNON 2,593,062
LIQUID LEVEL TANK GAUGE
Filed May 4, 1948 3 Sheets-Sheet 3
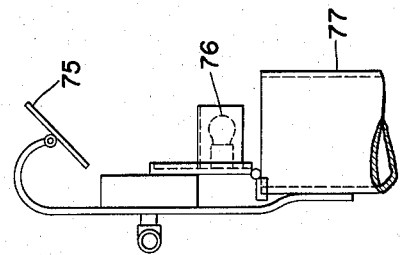
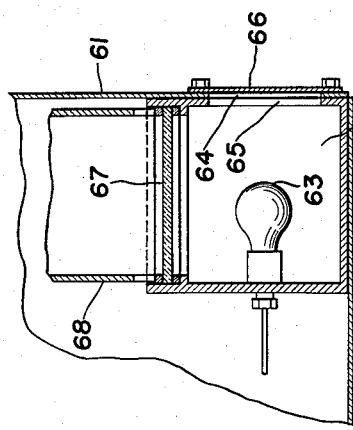
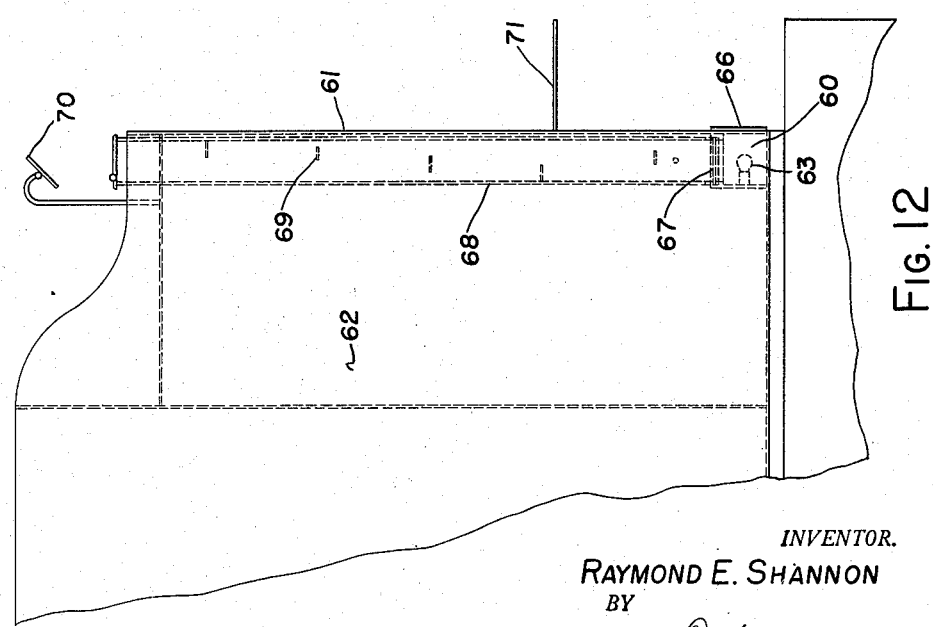
INVENTOR.
RAYMOND E. SHANNON
BY
Otto Moeller
Attorney Patented Apr. 15, 1952

2,593,062

UNITED STATES PATENT OFFICE 2,593,062

LIQUID LEVEL TANK GAUGE

Raymond E. Shannon, Du Bois, Pa.

Application May 4, 1948, Serial No. 24,926

10 Claims. (Cl. 73—293)

1

The present invention relates to gages for determining the depth or volume of fluid in a tank and particularly for determining the water level in a locomotive tender tank.

A number of devices are presently in use for determining the feed water height in a tender tank. In one type, a vertical pipe either inside or outside the tank, is provided at the bottom with a valve manually operative from the top of the tank bulkhead, by means of which water from the tank is admitted into the bottom of the pipe and the level indicated by water discharging from a series of holes or nipples in the pipe, or nipples connecting the pipe to holes in the side plate of the tank. Among other objectionable features of these devices, the water valve is subject to seizure and at times cannot be opened, the discharge openings become clogged because of corrosion or foreign material, and in cold weather freezing of water in the openings renders the device inoperative.

Other devices consisting of a gage or liquid in a U tube actuated by air pressure sufficient to balance a column of water equal in height to the level of the water in the tank, are subject to irregularities due to lack of proper maintenance, such as air screen or pipes plugged by foreign matter and leakage in air or water connections.

It is an object of the invention to provide an improved tender tank feed water height indicator that obviates the objectionable features of previous devices, and one that is simple in construction, requires little or no maintenance, gives a positive and reasonably accurate reading, is conveniently accessible for reading, and avoids valves and the use of other moving parts which are apt to get out of order.

It is another object of the invention to provide a water level indicating device, employing a tube disposed vertically in the tank cistern, in which the level indicating indicia are so disposed as to be readily visible from the top of the tube.

A further object of the invention is to provide a water level indicating device of the type just described with improved illuminating means for rendering the indicia plainly visible and legible.

Other objects and advantages of the invention reside in the structure, combination and arrangement of parts as will appear from the following description taken in connection with the accompanying drawings, in which:

Figure 1 is a front end elevation of a portion of a locomotive tender with parts broken away, with the invention shown applied to the tender tank;

Figure 2 is a sectional view taken on the line 2—2 of Figure 1;

Figure 3 is an enlarged view in side elevation

Figure 7:
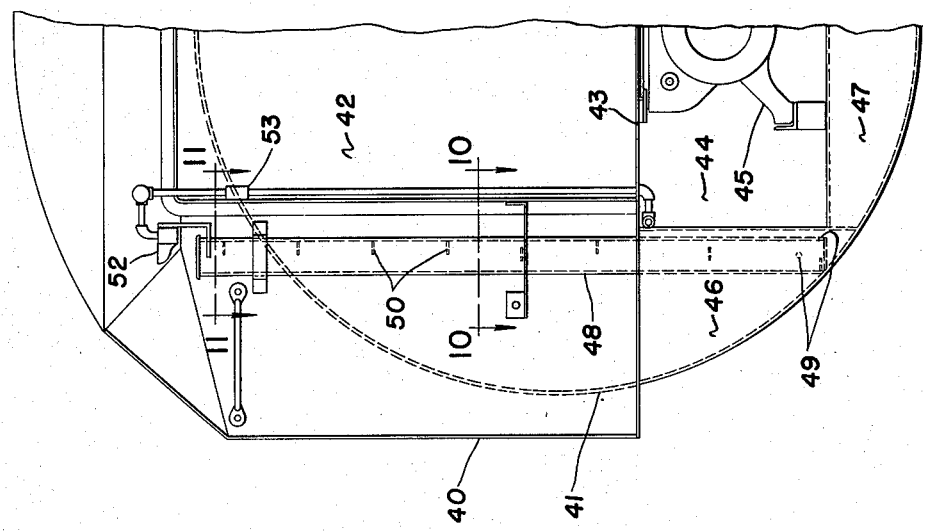
Figure 9:
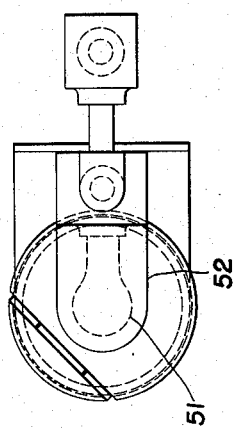
Figure 11:
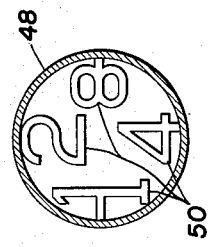
Figure 10:
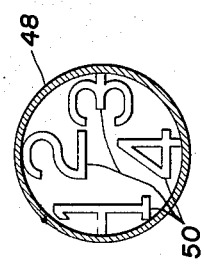
Figure 8:
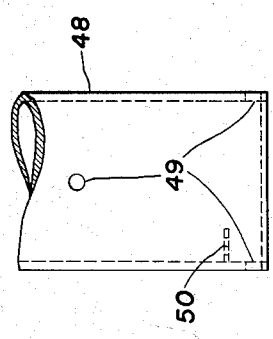

2 of the upper end of the novel water level indicator, showing the cover of the indicator tube in its open position and with the light source carried by the cover;

Figure 4 is a view of the device siimlar to that shown in Figure 3 with the cover and its attached light source in closed position;

Figure 5 is a fragmentary view in side elevation of a modification of the water level indicator with the cover in its open position;

Figure 6 is a view of the device similar to that shown in Figure 5 with the cover in its closed position;

Figure 7 is a front end elevation of a portion of a locomotive tender with another modification of the invention shown applied to the tender tank;

Figure 8 is an enlarged view in elevation of the lower portion of the indicator tube;

Figure 9 is a plan view of the water level indicator shown in Figure 7;

Figure 10 is a sectional view taken on line 10—10 of Figure 7;

Figure 11 is a sectional view taken on line 11—11 of Figure 7;

Figure 12 is a view in side elevation of the forward end portion of a locomotive tender with another form of the invention shown applied to the tank;

Figure 13 is a sectional view through the lower portion of the water level indicator shown in Figure 12; and Figure 14 is a view in elevation of the upper portion of another form of the invention.

While the invention may be used for the determination of the level of various kinds of liquids in a number of different forms of tanks, it is particularly adapted for determining the water level in a locomotive tender tank, and it is hereinafter so described.

Referring first to the form of the invention shown in Figures 1 through 4, and specifically to Figure 1, a locomotive tender is indicated generally by the numeral 10. Mounted on the tender frame 11 is the conventional superstructure defining the usual water tank and coal bin.

The bulkhead 12 communicates with and forms part of the water tank, the main portion of which lies behind the coal bin. The coal bin is provided at its forward end with coal gates, one of which is shown hingedly connected to the side of the bulkhead 12.

The bulkhead 12 is defined by the outer side wall 14 forming a continuation of the outer side wall of the tender tank, the inner side wall 15, the front wall 16, the bottom wall 17 and top wall 18.

The water level indicator includes a tube 19, preferably an approximately 5½ inch O. D. tube, extending vertically into the bulkhead 12 of the water tank to the bottom wall 17. The upper end of the tube 19 projects upwardly through the top wall 18. Any suitable means may be employed for securing the tube 19 in place, for example by welding it to the top wall 18 as shown at 20. The bottom of the tube 19 can if desired be welded to the bottom wall 17 of the tank or a bracket 21 secured to the front wall 16 may be employed for securing the tube 19 in place.

The bottom of the tube 19 is preferably closed while the upper end is provided with a hinged cover 22 which may be manually opened at will. A plurality of openings 23 are provided in the wall of the tube 19, preferably two openings closely adjacent the bottom of the tube and another opening approximately 6 inches above the other openings 23 are preferably ½ to ¾ inch in diameter, but the number, location and diameter of the openings may be altered if desired. The water entering the openings 23 will of course assume the same level in the tube 19 as in the main body of the tank.

Welded or otherwise suitably secured to the inner wall of the tube 19 are a plurality of indicia 24, extending inwardly of the tube in a plane at right angles to the axis thereof. The indicia are spaced from each other lengthwise of the tube 19 related to levels of different volumes in the tank. For convenience the indicia 24 are spaced at one foot intervals from the bottom of the tank and are in the form of numbers arranged consecutively in ascending order from bottom to top. Thus number 1 indicates a one foot level, the number 2 a two foot level and so on to the uppermost indicium.

In addition to being spaced from each other lengthwise of the tube 19, the indicia 24 are also circumferentially spaced from each other, so that when the level of the water in the tube is below the lowermost one of the indicia, they are all visible from the upper end of the tube, in other words the indicia do not overlap one another, as clearly shown in Figure 2.

In order to illuminate the inside of the tube 19 to make the indicia clearly visible, a light bulb 25 is mounted in a socket 26 secured to the under side of the cover 22. Wiring for the light bulb 25 extends from the socket 26 through a flexible cable 27 to a switch (not shown) in the switch box 28 and from the switch box 28 through the pipe 29 to a source of electric current. A bracket 30 secured to the tube 19 supports the switch box 28 above the upper end of the tube 19.

The switch in the switch box 28 is of the normally open type, and is arranged to be closed when the cover 22 is opened and contacts the switch button 31. Thus the bulb 25 is lit only when the cover 22 is raised to observe the level of the water in the tube 19, as shown in Figure 3. A reflecting shield 54 disposed about the bulb 25 and secured to the cover 22, reflects the light from the bulb downwardly into the tube 19 when the cover is raised, rendering the indicia clearly visible. The shield 54 and bulb 25 rest within the upper portion of the tube 19 when the cover 22 is closed, as shown in Figure 4.

The inside of the tube 19 and the indicia 24 are preferably painted with aluminum or otherwise coated with a bright surface to make the indicia more clearly visible.

In the modification shown in Figures 5 and 6, the light bulb 35 is permanently supported above the upper end of the tube 36 by means of a bracket 37, and the light may be manually turned on and off by a switch (not shown). As in the first form of the invention the tube 36 is provided with a hinged cover 38 and a reflector 39 for reflecting the light from bulb 35 down into the tube 36. The disposition of the tube 36 in the tender tank and the arrangement of the indicia in the tube 36 are the same as shown in the first form of the invention and has, therefore, not been shown.

In Figures 7 through 11 is shown a modified form of the invention applied to a different type of tender known as a cylindrical or "Vanderbilt" type tender. The tender, referring to Figure 7 is indicated generally by the numeral 40, and its cylindrical water tank is shown at 41. The upper forward end of the cylindrical water tank is recessed to provide a coal bin 42 having a deck 43, and a compartment 44 is provided below the deck 43 for housing the stoker trough 45. The portions of the tank 41 indicated by the numerals 46 and 47 below the deck 43 project forwardly beyond the remainder of the tank 41 and communicate with the main body of the cylindrical tank.

The tube 48, the upper part of which is outside the tank 41, extends downwardly through the deck 43 into the forwardly projecting water space 46 beneath the deck. As in the previously described form of the invention, openings 49 are provided in the lower portion of the tube 48, permitting water to enter the tube where it will seek the same level existing in the main portion of the tank.

Since the tank in this form of the invention is deeper than that of the first form or rectangular type tender tank, eight indicia represented by the reference character 50 are employed. The indicia are in the form of numerals 1 through 8 and are spaced a foot apart representing the height of water in the tank in feet. The tube, as before, is preferably approximately a 5½ inch O. D. tube, while the number 1 indicium is preferably 3 inches high, the numbers 2, 3 and 4 indicia are preferably 2 inches high, and the numbers 5, 6, 7 and 8 indicia are preferably 1¾ inches high.

The numbers 1, 2, 3 and 4 indicia are circumferentially spaced from each other, while the numbers 5, 6, 7 and 8 indicia are disposed vertically above the number 3 indicium. Since the diameter of the tube is considerably larger than the numbers 5, 6, 7 and 8 indicia, which are disposed vertically one above the other, they are nevertheless visible since they are in the upper portion of tube 48 and may be viewed at an angle from the upper edge of the tube 48 opposite the indicia. The numbers 1, 2 and 4 indicia are of course clearly visible since none of the other indicia overlap, and the number 3 indicium being higher than 5, 6, 7 and 8 is also clearly visible.

As before a light bulb 51 and reflector 52 are provided above the tube 48 and a conveniently located switch 53 is provided for turning the light on and off. It is apparent, of course, that a cover, light, and switch arrangement such as is shown in Figures 3 and 4 may also be employed.

In Figures 12 and 13 is illustrated another modification of the invention wherein a water tight compartment 60 is provided adjacent the front sheet 61 of the tender tank 62. Mounted in the compartment 60 is a light bulb 63 access to which is provided through an opening 64 in the tank front sheet 61 registering with an opening 65 in the front wall of compartment 60. The opening 64 is provided with a cover plate 66 removably attached to the tank front sheet 61.

The upper end of the compartment 60 is provided with a glass cover plate 67 secured in water tight relation with the compartment and through which glass light from the bulb passes into the vertical tube 68. The tube 68 is provided with indicia 69 as described above in connection with the form of the invention shown in Figure 1. A mirror 70 is adjustably mounted above the upper end of the tube 68 to permit viewing the inside of the tube to read the water level in the tank from a standing position on the tender deck 71.

In Figure 14 is shown a modification of the form of the invention illustrated in Figures 3 and 4 wherein a mirror is shown supported above the light bulb 76 and tube 77.

It is to be understood that the invention is not limited to the specific embodiments above described by way of example. Different features of the invention may be embodied in various combinations and subcombinations as defined in the appended claims.

I claim:

1. Indicating means for determining the liquid level in a tank comprising a tube adapted to extend downwardly in a tank, a plurality of indicia within said tube disposed in planes transverse with respect to the axis of said tube, said indicia being circumferentially spaced with respect to each other and being spaced at different elevations lengthwise of the tube related to different liquid levels in the tank.

2. Indicating means for determining the liquid level in a tank comprising a tube adapted to extend downwardly in a tank, a plurality of indicia secured to the inner wall of said tube disposed in planes transverse with respect to the axis of said tube, said indicia being circumferentially spaced with respect to each other and being spaced at different elevations lengthwise of the tube related to different liquid levels in the tank, and means to illuminate the inside of said tube.

3. Indicating means for determining the liquid level in a tank comprising a tube adapted to extend downwardly in a tank, a plurality of indicia secured to the inner wall of said tube disposed in planes transverse with respect to the axis of said tube, said indicia being circumferentially spaced with respect to each other and being spaced at different elevations lengthwise of the tube related to different liquid levels in the tank, and means positioned above the upper end of said tube to illuminate the inside of said tube.

4. Indicating means for determining the liquid level in a tank comprising a tube adapted to extend downwardly in a tank, indicia secured to the inner wall of said tube disposed in planes transverse with respect to the axis of said tube, said indicia being circumferentially spaced with respect to each other and being spaced lengthwise of the tube related to different liquid levels in the tank, and means positioned below the lower end of said tube to illuminate the inside of said tube.

5. Indicating means for determining the liquid level in a tank comprising a tube adapted to extend downwardly in a tank, a plurality of indicia within said tube disposed in planes transverse with respect to the axis of said tube, said indicia being disposed in circumferential spaced relation at different elevations lengthwise thereof related to different liquid levels in the tank, a hinged cover for the upper end of said tube, and illuminating means secured to the under side of said cover arranged to swing to a position within said tube when said cover is closed and to a predetermined position above said tube to direct light rays into said tube when said cover is opened.

6. Indicating means for determining the liquid level in a tank comprising a tube adapted to extend downwardly in a tank, a plurality of indicia secured to the inner wall of said tube in circumferential spaced relation at different elevations lengthwise thereof related to different liquid levels in the tank, a source of light and a reflector for reflecting light from said source into said tube.

7. Indicating means for determining the liquid level in a tank comprising a tube adapted to extend downwardly in a tank, indicia secured to the inner wall of said tube in circumferential spaced relation at different points lengthwise thereof related to different liquid levels in the tank, means to illuminate the inside of said tube, and a mirrored surface above said tube disposed in a plane at an angle with respect to the axis thereof to render the inside of the tube visible from one side thereof.

8. Indicating means for determining the liquid level in a tank comprising a tube adapted to extend downwardly in a tank, a compartment at the bottom of said tube registering therewith and a window between said tube and compartment, indicia secured to the inner wall of said tube in circumferential spaced relation at different points lengthwise thereof related to different liquid levels in the tank, and means in said compartment to illuminate the inside of said tube.

9. Indicating means for determining the liquid level in a tank, comprising a tube adapted to extend downwardly in a tank, indicia secured to the inner wall of said tube disposed in planes transverse with respect to the axis of said tube and being spaced lengthwise of the tube related to different liquid levels in the tank, the lower of said indicia being circumferentially spaced with respect to each other and the upper of said indicia being disposed vertically one above the other, and means to illuminate the inside of said tube.

10. Indicating means for determining the liquid level in a tank comprising a tube adapted to extend downwardly in a tank, a plurality of indicia secured to the inner wall of said tube disposed in planes transverse with respect to the axis of said tube, said indicia being circumferentially spaced with respect to each other and being spaced at different elevations lengthwise of the tube related to different liquid levels in the tank.

RAYMOND E. SHANNON.

REFERENCES CITED

The following references are of record in the file of this patent:

UNITED STATES PATENTS

| Number | Name | Date |
| --- | --- | --- |
| 1,264,143 | Bennett | Apr. 30, 1918 |
| 1,818,295 | Bohnhardt | Aug. 11, 1931 |
| 1,867,204 | Bohnhardt | July 12, 1932 |
| 1,926,945 | Hipp | Sept. 12, 1933 |
| 2,329,412 | Nelson | Sept. 14, 1943 |